USOO5621994A

United States Patent [19]
Cobb et al.

[11] Patent Number: 5,621,994
[45] Date of Patent: Apr. 22, 1997

[54] SIGN ASSEMBLY WITH ADJUSTABLE CORNERS

[75] Inventors: Ronald W. Cobb, Atlanta; Benjamin H. Bell, Avondale Estates; Jeff A. Hampton, Powder Springs; Danny L. Roberts, Auburn, all of Ga.

[73] Assignee: APCO Graphics, Inc., Atlanta, Ga.

[21] Appl. No.: 434,245

[22] Filed: May 4, 1995

[51] Int. Cl.⁶ .................................................. G09F 1/12
[52] U.S. Cl. ............................... 40/782; 40/739; 40/605; 403/401; 403/73
[58] Field of Search ............................ 40/156, 155, 157, 40/152, 152.1, 605, 782, 739; 403/401, 93, 65

[56] References Cited

U.S. PATENT DOCUMENTS

| 1,657,589 | 1/1928 | Rossler ....................................... 40/155 |
| 1,750,213 | 3/1930 | Collins . |
| 2,072,754 | 3/1937 | Jones . |
| 2,255,226 | 5/1941 | Draughn ..................................... 403/73 |
| 2,703,724 | 3/1955 | Der Yuen et al. ..................... 403/73 X |
| 2,790,258 | 4/1957 | Freshour . |
| 4,073,455 | 2/1978 | Gunther . |
| 4,157,128 | 6/1979 | Peters . |
| 4,348,826 | 9/1982 | Reim . |
| 4,562,656 | 1/1986 | Kristofich . |
| 4,666,328 | 5/1987 | Ryu . |
| 5,050,324 | 9/1991 | Casull . |

FOREIGN PATENT DOCUMENTS

| 2257807 | 8/1975 | France ..................................... 403/401 |
| 343685 | 11/1921 | Germany ................................. 403/73 |
| 3626473 | 2/1988 | Germany ................................. 403/73 |

Primary Examiner—Kenneth J. Dorner
Assistant Examiner—Cassandra Davis
Attorney, Agent, or Firm—Jones & Askew

[57] ABSTRACT

A sign frame for directory or other applications, and having adjustable corners permitting the sign to assume orthogonal and nonorthogonal configurations. Each adjustable corner connector has first and second elements that respectively connect to contiguous ends of adjacent edge members making up the sign. The elements of the adjustable corner connector are pivotably interconnected at hubs that are spatially displaced from the edge members, so that the hubs fit within the outline of the assembled frame without interfering with the edge members making up that frame.

14 Claims, 3 Drawing Sheets

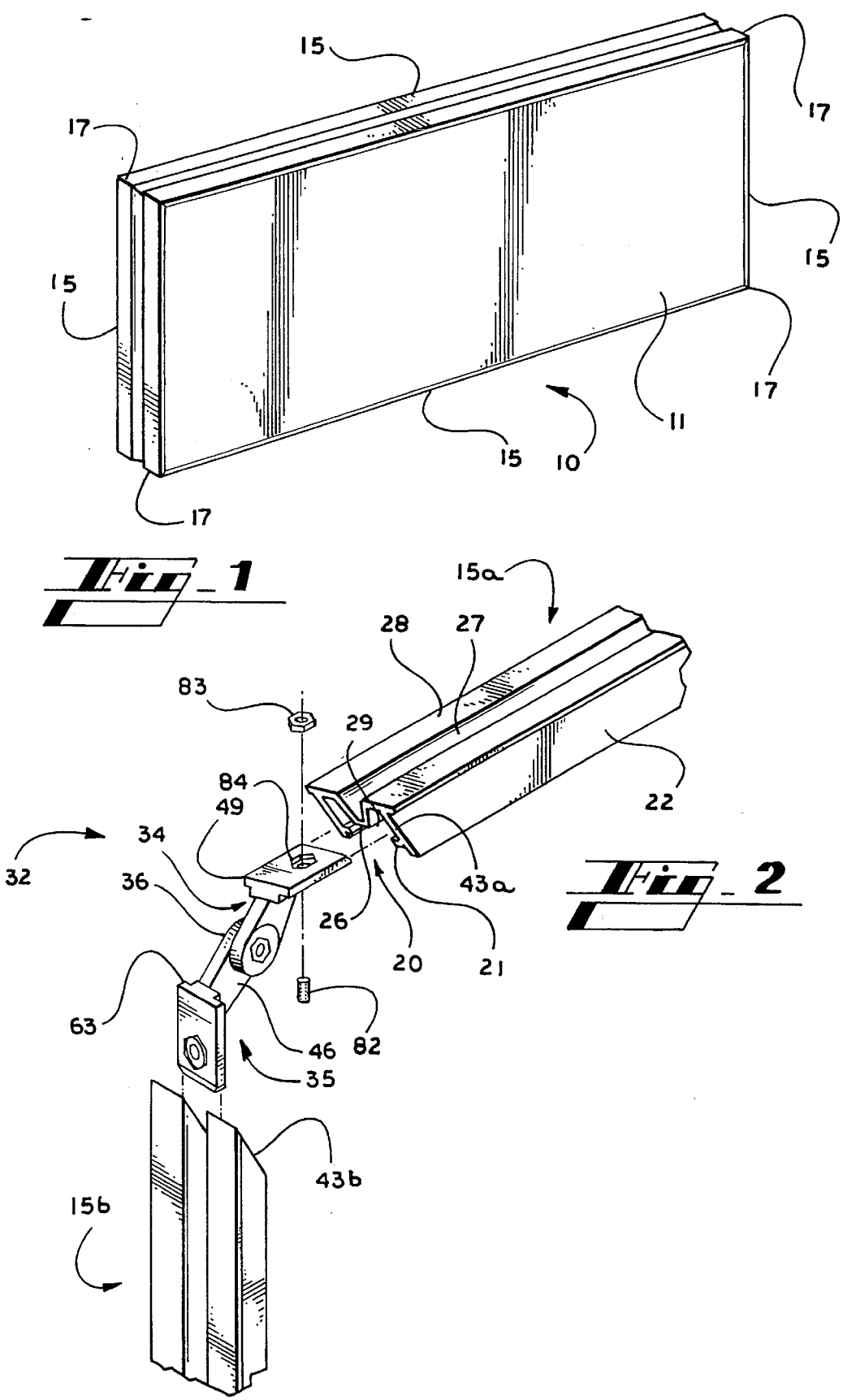

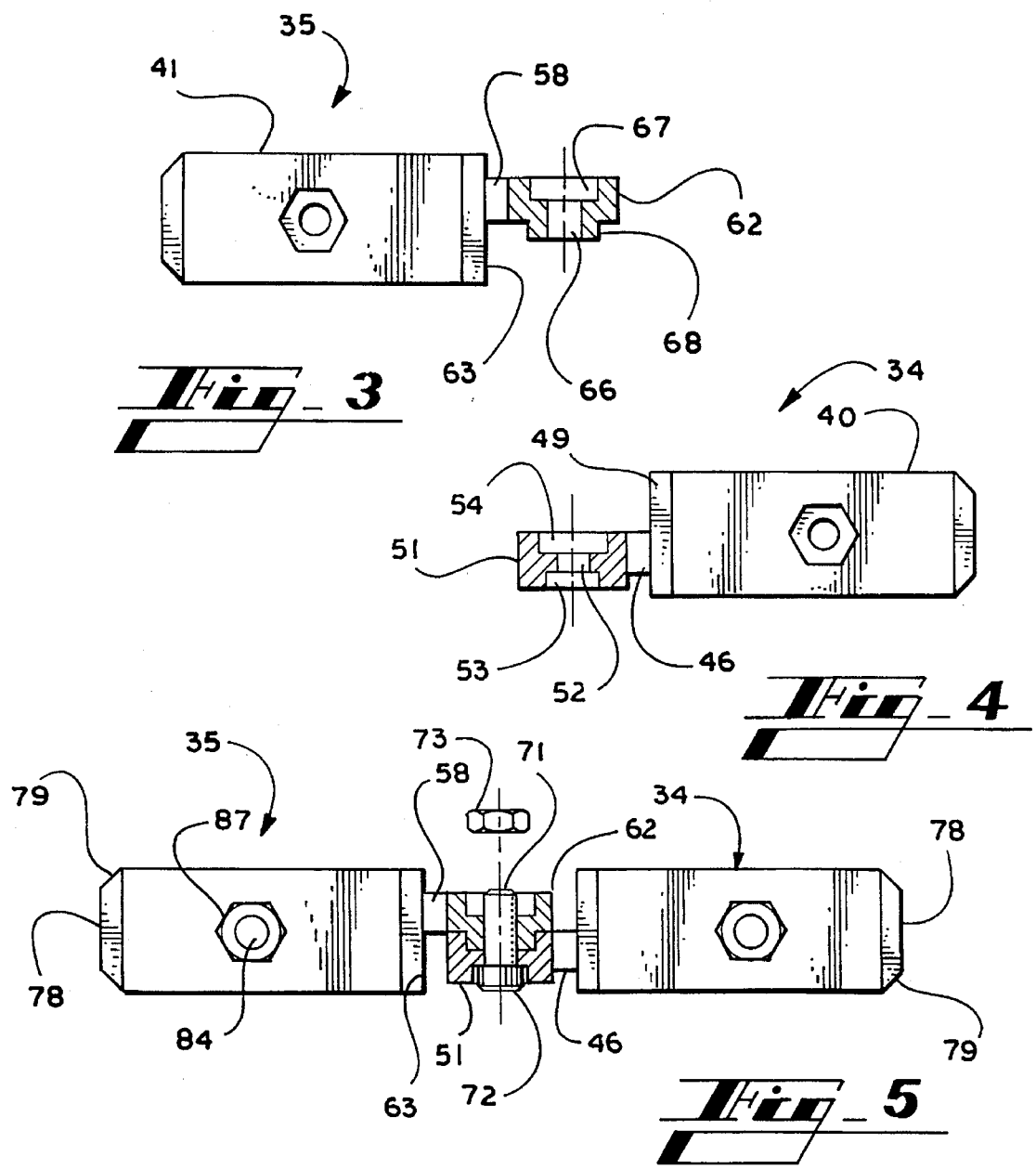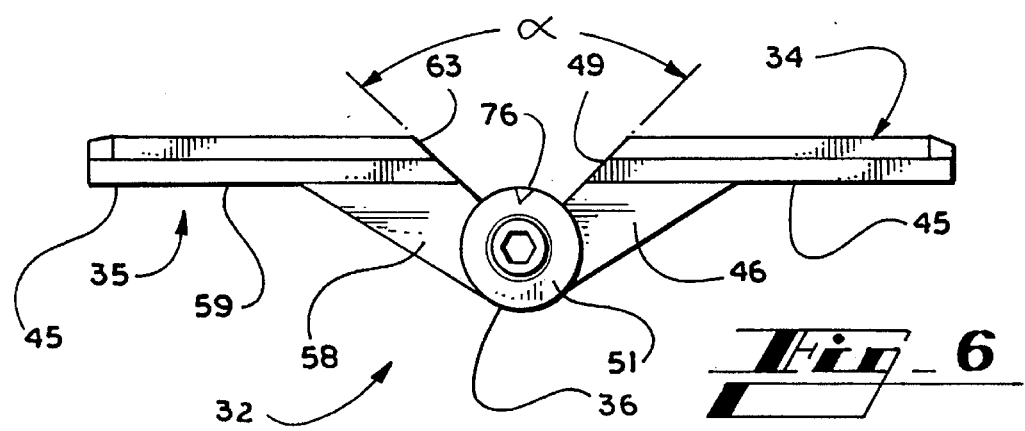

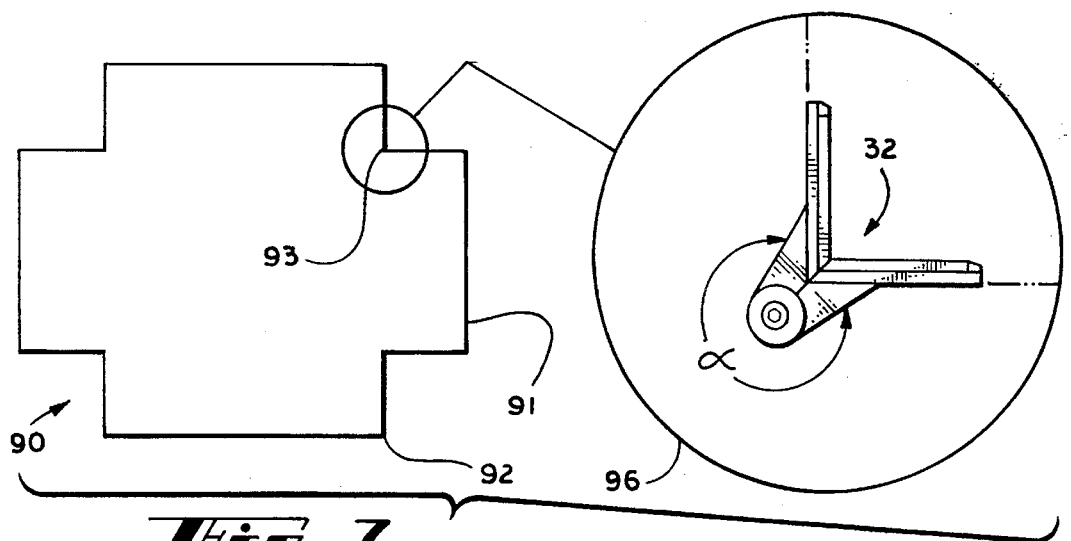
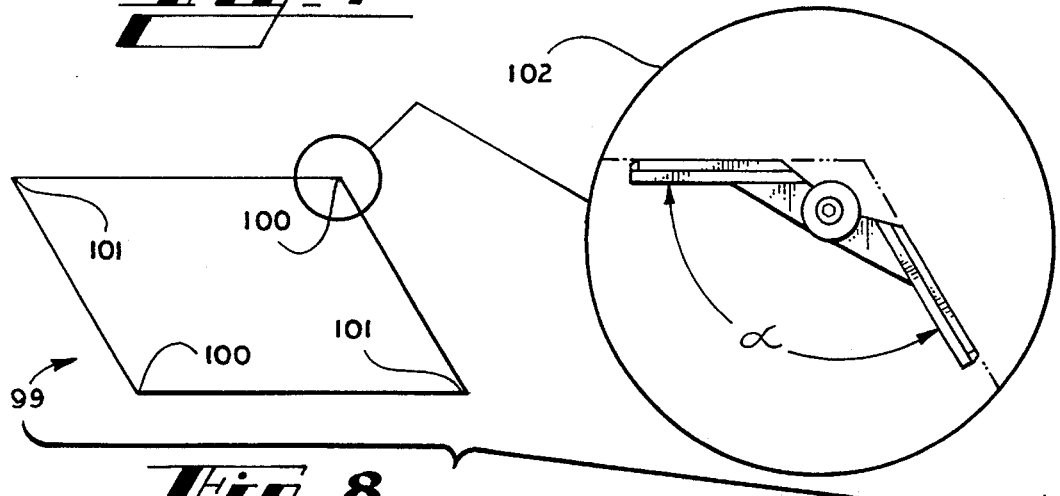
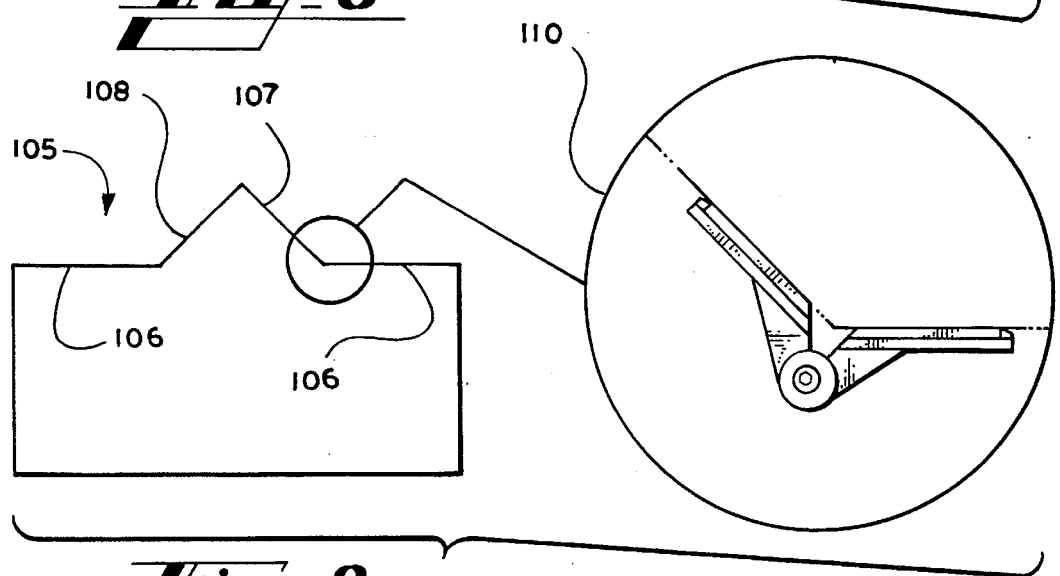

SIGN ASSEMBLY WITH ADJUSTABLE CORNERS

FIELD OF THE INVENTION

This invention relates in general to signs, and relates in particular to directory signs or the like.

BACKGROUND OF THE INVENTION

Directory signs are known and used in a wide variety of applications. These signs typically list persons or departments within an organization, and identify by room number or other information the particular locations of those places. Directory signs can range in size and construction from the one-of-a-kind directory custom designed for installation in a single location such as the lobby of a building, to signs of relatively standard size and configuration and intended for use in various applications. The present invention is primarily concerned with signs of the latter kind.

Typical conventional directory signs usually are rectangular in overall shape. A rectangular frame defines the periphery of the sign, and one or more panel members mounted on the peripheral frame provide support for the directory message board itself or for individual message strips containing the name of each person or office identified by the directory. The directory sign also may have one or more center supports intermediate the ends of the sign, depending on the overall length of the sign. Some directory signs are available in standard rectangular shapes to accommodate conventional applications. However, it is known to construct signs of desired width and height by using various standard components provided for that purpose. These sign components typically include edge members that can be cut to fit the height and width of a desired sign, and corner members adapted to join together the edge members in a fixed angular relation. Because most directory signs are rectangular, these edge members are right-angle corner members adapted to join the confronting ends of adjacent edge members for connecting those members to form a sign frame having a rectangular overall shape. One or more message panels then is mounted on the overall sign frame fabricated from those components.

Directory signs and the like constructed from standard components permit a measure of customized design at reasonable cost, because those signs are assembled from components produced for the purpose and require no custom manufactured components. However, practical considerations limit the overall shape of such signs to rectangular shapes, namely, signs having four sides joined together by right-angle corner elements made for the purpose. Although the signs and their construction are not inherently limited to rectangular configurations formed by right-angle corners, constructing signs of non-rectangular polygonal configurations would require producing and stocking corner members in a wide variety of configurations other than right angles. For example, signs having a parallelogram construction would require corner members having two different complementary angular shapes, namely, two acute-angle corners and two complementary obtuse-angle corners. Moreover, the conventional sign construction is not immediately adaptable to producing directory signs having a nonrectangular orthogonal shape, because the inside right-angle corners of nonrectangular orthogonal signs require corner angle members of different construction from the conventional outside corner angles.

SUMMARY OF THE INVENTION

Stated in general terms, it is an object of the present invention to provide improved sign apparatus.

It is another object of the present invention to provide an improved directory sign.

It is still another object of the present invention to provide a sign frame readily adaptable to rectangular or nonrectangular orthogonal configurations.

It is a further object of the present invention to provide an improved corner angle for use with a sign frame.

It is yet another object of the present invention to provide a corner angle for use with sign frames and capable of assuming any desired angle within a range of angles.

Stated in general terms, a sign assembly according to the present invention includes a number of elongate edge members arranged in an end-to-end configuration to define a sign frame of any desired orthogonal configuration. The contiguous ends of adjacent edge members are joined by separate corner connectors, with at least some of those connectors being selectively adjustable to vary the included angle between those edge members. By selecting the desired included angle at some or all corners between respective adjacent edge members, the edge members can be configured to define polygonal signs of various desired configurations. That polygon defines the outer periphery or frame of a sign for supporting directory information or other useful or desired indicia.

Stated in somewhat greater detail, each adjustable corner connector according to the present invention comprises two elements, the elements being connected to respective contiguous ends of adjacent edge members making up the frame of a sign. The two elements, in turn, are connected to each other for adjustable mutual angular positioning of the elements. Positioning the elements of each corner connector to a certain included angle thus also defines the included angle between the two adjacent edge members connected to the elements. A fastening device or the like is associated with the elements of the corner connector, to fix those elements at any desired angular position within an available range of angles.

Stated in further detail, the elements of a corner connector each have a plate or similar member for attachment to the contiguous end of an edge member making up the sign frame. A support web connects to the plate and extends outwardly therefrom to a hub. The hubs of each element making up a corner connector are pivotably interconnected, allowing those elements movement to assume the desired included angle between the particular edge elements associated with that corner connector.

The present invention, as well as other objects and advantages thereof, will become more apparent from the following description of a preferred embodiment, including the drawings as described below.

BRIEF DESCRIPTION OF DRAWINGS

FIG. 1 is a pictorial view showing a directory sign according to a preferred embodiment of the present invention.

FIG. 2 is an exploded and enlarged view showing a corner connector and fragments of adjacent edge members used in the preferred embodiment.

FIG. 3 is a plan view showing one element of the corner connector in FIG. 2.

3

FIG. 4 is a plan view showing another element of the corner connector in FIG. 2.

FIG. 5 is a partially-sectioned plan view showing the elements of FIGS. 3 and 4 assembled to form the disclosed corner connector.

FIG. 6 is a side view of the assembled corner connector shown in FIG. 5.

FIGS. 7, 8, and 9 are front views showing some other alternative configurations of directory sign according to the present invention, with one corner thereof shown enlarged for detail.

DETAILED DESCRIPTION OF PREFERRED EMBODIMENT

Turning first to FIG. 1, there is shown generally at 10 a sign constructed according to the present invention. The sign 10 includes a front panel 11 and a back panel (not shown), and both panels are supported on a frame comprising four elongate edge members collectively designated at 15. The edge members 15 define the outer perimeter of the sign 10 and adjacent edge members adjoin one another at corners 17. Because the sign 10 in the disclosed embodiment is rectangular in overall shape, each corner 17 defines a 90° included angle between the two edge members 15 joining at that corner. Each edge member 15 in typical sign construction is an extrusion of aluminum or another suitable material, and a standard 45° miter is required at the contiguous ends of the adjacent joint members. The front and back panels of the sign 10 may be affixed to the assembled frame by double-sided adhesive tape or by any other suitable technique, as is known to those skilled in the art.

The assembled sign 10 can display directory information or any other form of indicia that may be applied to or supported on the front panel 11. The term "directory sign" thus suggests one well-known application for signs constructed according to the present invention, but that term is exemplary only and is not intended to limit other possible applications or uses for signs constructed according to this invention.

Each edge member, such as the edge member 15a shown in FIG. 2, has a channel 20 formed within the inwardly-facing side of the edge member and extending along the longitudinal dimension of that member. The edge members 15 in the disclosed embodiment have an elongate rib 21 extending inwardly from each side 22 of the edge member, so that the ribs face each other in spaced-apart relation along the channel 20. Each rib 21 is located, along the width of the sides 22, a predetermined spacing out beyond the inside surface 26 of the channel 27 formed along the wall 28 joining the sides 22 of each edge member 15. This spacing between the ribs 21 and the inside surface 26 of the channel 27 forms a slot for receiving portions of the adjustable corner connectors as described below. However, those skilled in the art will realize that the internal shape of the particular edge members 15 disclosed herein is by way of example only, and that edge members formed with alternative internal shapes are within the skill of the art.

The corners of a conventional directory sign are joined together by a fixed right-angle corner member, not shown, that fits within the slots 29 at the contiguous ends of adjacent edge members. The present invention includes an adjustable corner connector 32, FIG. 2, for interconnecting the ends of adjacent edge members either at the right angles required for the four-sided rectangular sign 10, or at other angles required for rectangular signs having plural edge members defining the frame of the sign. Each corner connector 32 has a first element 34 and a second element 35, and those elements are interconnected at a pivotable connection 36. This interconnection 36 allows adjusting the included angle $\partial$ (FIG. 6) between the elements of the adjustable corner connector to vary between minimum and maximum angles determined by the construction of the corner connector. In a preferred embodiment of the adjustable corner connector according to the present invention, the included angle $\partial$ is adjustable to any angle within a 330° range.

Turning to FIGS. 3 and 4, each element 34 and 35 of the adjustable corner connector includes a plate 40, 41 of generally rectangular shape. The shape and thickness of those plates is configured so that each plate is a sliding fit into the slot 29, described above, defined by the ribs 21 and the channel 27 in the contiguous end of each adjacent edge member 15. Thus, the plate 40 of the element 34 slidably fits within the slot at the beveled end 43a of the edge member 15a, and the plate 41 likewise slidably fits within the corresponding slot accessible at the beveled end 43b of the edge member 15b. The plates 40 and 41, shown in FIG. 2 in exploded view relative to the edge members 15a and 15b, in assembly are positioned within the respective slots 29 so that the contiguous beveled ends 43a and 43b of the edge members are in abutting contact. In that position, the adjustable corner connector 32 lies entirely within the frame defined by the edge members 15, so that the adjustable corner connector (as well as corner connectors at the other corners 17 of the sign) are concealed from view behind the front panel 11 of the sign.

A web 46 is connected to the underside 45 of the plate 40, on the element 34. The "underside" 45 of the plate 40 here defined as the side that faces toward the interior of the sign 10 as the plate is received in an edge member 15 defining the perimeter of that sign. The web 46 extends downwardly from the underside 45 in a generally diagonal direction relative to the plane of the plate 41, ending at a remote end spaced outwardly from the end 49 of the plate that faces the corresponding end of the plate 41 on the second element 35 making up the adjustable corner connector. That remote end of the web 46 supports a hub 51, best seen in FIG. 4, through which extends a cylindrical opening 52 on an axis perpendicular to the longitudinal axis of the plate 40 and parallel to the plane of that plate. Facing counterbores 53 and 54, coaxial with the opening 52, are formed on opposite sides of the hub 51. FIG. 4 shows that the diameter of the counterbore 54 is somewhat larger than that of the counterbore 53, for a purpose described below. The first element 34, including the plate 40, the hub 51, and the web 46 that supports the hub relative to the plate, may be of unitary construction and preferably is molded or otherwise formed of a suitable plastic material.

The design and construction of the second element 35 closely parallels that of the first such element 34. A web 58 extends downwardly from the underside 59 of the plate 41 in the second element, terminating at a remote end supporting a hub 62. The hub 62 lies below the underside 59 of the plate 41 and extends to the right of the inner end 63 of that plate, as best seen in FIG. 6. A cylindrical opening 66 extends through the hub 62 on an axis perpendicular to the longitudinal extent of the plate 41 and the edge member 15b to which that plate connects, and parallel to the plane of the plate. A counterbore 67 coaxial with the opening 66 is on one side of the hub 62, and a circular boss 68 coaxial with the opening is formed on the opposite side of that hub. The axis of the opening 66, the counterbore 67, and the boss 68 is perpendicular to the longitudinal axis of the plate 41 and parallel to the plane of that plate. The outer diameter of the boss 68 is slightly less than the diameter of the counterbore 54 in the hub 51 associated with the first element 34.

The two elements 34 and 35 of the adjustable corner connector 32 are assembled by placing the boss 68 of the second element into the counterbore 54 of the first element. Those elements then are secured together by a bolt 71, FIG. 5, extending through the axially-aligned openings 53 and 66 in the hubs 51 and 62. The bolt 71 is secured in place by a locknut 73 that fits within a recess provided by the counterbore 57 on the hub 62. The head 72 of the bolt 71 likewise is at least partially received in the counterbore 53 within the hub 51.

The use of the adjustable corner connector 32 in connection with the sign assembly is now discussed. Once the overall configuration of the sign 10 is designed, that overall configuration determines the included angles at each corner of the sign. For a rectangular sign such as the sign 10 disclosed herein, each corner 17 requires a 90° angle. Once the four edge members 15 are cut to the lengths required for the particular sign, with each end of the edge members beveled at 45°, four corner connectors 32 are set to provide the 90° angle connection for each corner 17 of the sign. Because 90° angles will be a commonplace setting of the adjustable corner connectors 32, an index mark 76 (FIG. 6) may advantageously be molded or otherwise formed into the hubs 51 and 62 of the elements 34 and 35 comprising the adjustable corner connector. It will be understood that additional fixed degree settings may be designed into the hubs for degree angle settings at other frequently-used sign shapes, for example, 30°, 45°, and 60°. It will also be understood that the index marks 76 on the hubs may be supplanted or replaced by complementary detent structure on the hubs that physically locate the two hubs at one or more predetermined angles, such as 90°.

Once the hubs of the corner connector 32 are adjusted to the desired included angle $\partial$, the bolt 72 and nut 73 are tightened to physically lock together the first and second elements 34 and 35 of the corner connector. With the corner connectors now set at the desired angle, each corner of the sign frame is assembled by sliding the plates 40, 41 of the corner connector into the slots 29 in the contiguous ends 43a, 43b of the edge members 15. The positional offset of the hubs 51 and 62, provided by the remote location of the those hubs on the webs 46 and 48, allows the ends 43a, 43b of the adjacent edge members 15 to contact one another without interference. The corners of the outer end 78 on each plate 40, 41 are beveled as at 79 to assist in inserting those plates into the slots 29 of the edge members. Once each corner 17 is thus assembled, a set screw 82 (FIG. 2) is threaded into an opening 84 in each plate 40, 41 to engage a jam nut 83, located within a recess 87 (FIG. 5) on the upper side of the plates facing the inside surface of the channel 27 in each edge member. Tightening the set screw 82 into the jam nut applies pressure against the plate 40, 41 as the outer end of the set screw engages the underside of the outer channel 27, thereby locking each plate into position within the corresponding edge member 15. The frame for the sign 10 now is assembled, and other components of the sign can be attached to the frame in the customary manner.

FIGS. 7, 8, and 9 show three examples of alternative sign shapes readily available with adjustable corner connectors according to the present invention. In FIG. 7, the sign 90 has a somewhat cruciform overall shape, made of twelve separate edge members 91 joined by a like number of corner connectors. Although each corner of the sign 90 is a fight-angle corner, the outside corners 92 are conventional 90° included-angle corners, the detail in the enlarged inset 96 shows that the inside corners 93 actually define an included angle $\partial$ of 270° between the inner sides of the edge members adjacent to that corner. However, the adjustable corner connectors 32 are suitable for both the inside and the outside corners.

Each outside corner 92 is connected by an adjustable corner connector adjusted in the manner described above with regard to FIG. 2. The adjustable corner connector for each inside corner 93 is adjusted as shown in the inset 96 of FIG. 7. With the bolt 71 loose in the pivotable interconnection 36 between the first and second elements of the corner connector, those elements are pivoted to place the webs 46 and 48 in abutting contact, a position defining the included angle $\partial$ of 270° between the top faces of the plates 40 and 41. The lock nut 73 then is tightened to secure the adjustable corner connector in that position, whereupon the corner connector is inserted into the adjacent edge members in the manner described above. A single kind of adjustable corner connector thus is usable for assembling both the outside corners and the inside corners of the sign 90.

Turning next to FIG. 8, the sign 99 shown therein has four sides joined together at angles forming the overall sign in the shape of a parallelogram, instead of a rectangle as in FIG. 1. The corners of the sign 99 thus form two identical obtuse angles 100 and two identical acute angles 101. The detail inset 102 shows a corner connector according to the present invention, set at an obtuse angle $\partial$ required for that angle. It will be understood that the adjustable corner connectors for each acute-angle corner 101 are set to a different included angle corresponding to that acute angle.

FIG. 9 shows an example of a nonorthogonal sign 105 easily formed with adjustable corner connectors according to the present invention. The sign 105 has seven sides joined at a like number of corners, and resembles a rectangle with the upper side 106 modified by two smaller edge members 107, 108 forming a pyramid extending upwardly from the nominal longitudinal axis of the upper side. The inset 110 shows an adjustable corner angle set to interconnect one of the smaller edge members 107 with one of the upper side edge members 106. This adjustable corner member is set at an obtuse included angle for that purpose.

The foregoing examples illustrate only some sign configurations that become feasible with the present adjustable corner connector. A sign designer can specify polygonal signs having any desired external configuration meeting the demands or aesthetic requirements of a particular location, without limitation imposed by fixed right-angle corner connectors or by the cost and time delays of custom-designed corner connectors required for different or nonstandard corner angles. The sign fabricator needs stock only one kind of corner connector, and those corner connectors are quickly and easily adjustable to provide a corner connector of any desired angle within the available range of angles designed for the connector. The present invention thus permits greater flexibility of sign design and greater economy of fabrication for such signs.

It should be understood that the foregoing relates only to a preferred embodiment of the present invention, and that numerous changes and modifications therein may be made without departing from the spirit and scope of the invention as defined in the following claims.

What is claimed is:

1. An adjustable sign assembly, comprising:

a plurality of elongate edge members each having first and second ends;

the edge members being arranged in an end-to-end configuration with the first end of one of said edge members located adjacent to the second end of another of said edge members at an included angle between adjacent edge members to form corners of a sign frame having a predetermined overall polygonal planar configuration;

separate corner connectors operatively interconnecting the adjacent ends forming at least some of the corners;

at least one said corner connector including means selectably adjustable to vary the included angle between two adjacent ones of said elongate edge members through a range of angles, thereby adjusting the overall polygonal configuration in the plane of the sign frame; and said adjustable means being affixed to the two adjacent ones of said elongate edge members in lateral offset relation to said adjacent elongate edge members, thereby allowing said first and second ends of the elongate edge members to contact one another without interferences from the adjustable means.

2. The sign assembly as in claim 1, wherein:

each corner of the sign frame is interconnected by a separate one of said corner connectors so that the included angle at each corner of the sign frame is separately adjustable to vary the overall polygonal configuration of the sign frame; and each one of the separate corner connectors includes a said adjustable means laterally offset from the adjacent edge members forming the corners of the sign frame, so that the adjustable means are located in lateral offset relation to the edge members and within the frame comprised by the elongate edge members.

3. The sign assembly as in claim 1, wherein each of said corner connectors comprises:

a first element connected to an end of one of said edge members and a second element connected to a contiguous end of the adjacent one of said edge members; and said adjustable means interconnects the first and second elements of the corner connector and selectably adjusts the included between the first and second elements in the plane of the sign frame, thereby adjusting the included angle between the edge members connected to the corner connectors, throughout the range of angles, so as to maintain the sign frame in a predetermined polygonal configuration determined by the selected adjustment of the corner connectors.

4. The sign assembly as in claim 3, wherein:

the interconnecting means comprises a hub connected to one element of the corner connector and a complementary hub connected to the other element thereof;

the hubs being operative to fit together for said adjustable angular positioning of the elements.

5. The sign assembly as in claim 4, further comprising:

means releasably locking together the hubs at a selected mutual angular position in the range of angles.

6. The sign assembly as in claim 5, further comprising:

indicia associated with at least one of the hubs to indicate the selected angular position of the hubs.

7. The sign assembly as in claim 3, wherein each said element of the corner connectors comprises:

a plate attached to the contiguous adjacent end of one of the edge members in parallel relation to an elongate extent of the edge member;

a support web connected to the plate and extending to a remote end laterally spaced apart from one edge member; and angle adjusting means located at the remote end and operative for connection to a corresponding angle adjusting means located at the corresponding remote end of the other element of the corner connector;

so that the corner connector allows adjusting the included angle between the adjacent edge members without interference from the angle adjusting means laterally spaced apart from the adjacent edge members.

8. The sign assembly as in claim 7, wherein:

the angle adjusting means of one of said first and second elements comprises a first hub of circular configuration, and for the other said element comprises a complementary hub for angularly pivotable operative association with the first hub; and the hubs are supported by the respective support webs for location laterally spaced apart from the adjacent edge members.

9. The sign assembly as in claim 7, wherein:

the plate of each element is configured to be received within a channel formed in the contiguous end of the adjacent edge member.

10. An adjustable sign assembly, comprising:

a plurality of elongate edge members each having first and second ends;

the edge members being arranged in an end-to-end configuration with the first end of one of said edge members located adjacent to the second end of another of said edge members at an included angle between adjacent edge members to form corners of a sign frame having a predetermined overall polygonal planar configuration;

separate corner connectors operatively interconnecting the adjacent ends forming at least some of the corners, at least one said connector being selectably adjustable to vary the included angle through a range of angles, thereby adjusting the overall polygonal configuration in the plane of the sign frame;

each of said corner connectors comprising:

a first element connected to an end of one of said edge members and a second element connected to a contiguous end of the adjacent one of said edge members; and means interconnecting the first and second elements of the corner connector for adjustably fixable mutual angular positioning of the first and second elements in the plane of the sign frame, and thus of the edge members connected to the corner connectors, throughout the range of angles, so as to maintain the sign frame in a predetermined polygonal configuration determined by the fixed angular position of the corner connectors;

each said element of said corner connectors comprising:

a plate attached to the contiguous adjacent end of one of the edge members in parallel relation to an elongate extent of one edge member;

a support web connected to the plate and extending to a remote end spaced apart from one edge member; and angle adjusting means at the remote end operative for complementary and angularly-adjustable connection to the corresponding angle adjusting means of the other said element of the corner connector, so that the corner connector allows adjusting the included angle between the adjacent edge members without interference from the angle adjusting means laterally spaced apart from the adjacent edge members;

the angle adjusting means of one of said first and second elements comprises a first hub of circular configuration, and for the other said element comprises a complementary hub for angularly pivotable operative association with the first-mentioned hub;

the hubs are supported by the respective support webs for location laterally spaced apart from the adjacent edge members;

the first hub has a circular boss extending on an axis perpendicular to the planar configuration of the sign frame and having an opening;

the complementary hub has a circular recess receiving the boss for relative rotation through the range of angles and having an opening coaxial with the opening in the first hub; and a fastener extending in the coaxial openings and selectively operative to secure the hubs at a selected included angle.

11. An adjustable corner connector for use in fabricating a sign assembly including a plurality of elongate edge members each having first and second ends, so that the edge members are connected in an end-to-end configuration with a first end of one said edge member located adjacent to a second said end of another edge member at an included angle between adjacent edge members to form corners of a sign frame having a predetermined overall polygonal planar configuration, the corner connector comprising:

a first element configured for connection to an end of an edge member in a certain alignment therewith and a second element configured for connection to a contiguous end of the adjacent edge member in certain alignment therewith; and means interconnecting the first and second elements of the corner connector for adjustably fixable mutual angular positioning of the first and second elements in the plane of the sign frame, and thus of the edge members connected to the corner connectors, throughout the range of angles, so as to maintain the sign frame in a predetermined polygonal configuration determined by the fixed angular position of the corner connectors;

each said element of the corner connector comprising:

a plate adapted for attachment to the contiguous adjacent end of one of the edge members in parallel relation to an elongate extent of the edge member;

a support web connected to the plate and extending to a remote end spaced apart from one edge member; and angle adjusting means at the remote end operative for complementary and angularly-adjustable connection to a corresponding angle adjusting means of the other said element of the corner connector, so that the corner connector allows adjusting the included angle between the adjacent edge members without interference from the angle adjusting means disposed apart from the adjacent edge members;

the angle adjusting means of one of said first and second elements comprises a first hub of circular configuration, and for the other said element comprises a complementary hub for angularly pivotable operative association with the first hub;

the hubs are supported by the respective webs for location outside the elongate extents of the adjacent edge members;

the first hub has a circular boss extending on an axis perpendicular to the planar configuration of the sign frame and having an opening;

the complementary hub has a circular recess receiving the boss for relative rotation through the range of angles and having an opening coaxial with the opening in the first hub; and a fastener extending in the coaxial openings and selectively operative to secure the hubs at a selected included angle.

12. An adjustable frame assembly for defining a frame having a predetermined planar configuration, comprising:

a plurality of elongate members each having a pair of ends;

the elongate members being arranged in an end-to-end configuration with one said end of each said elongate member at a predetermined included angle adjacent to a said end of another said elongate member to form corners of the frame with the predetermined planar configuration; and adjustable corner connectors interconnecting adjacent said ends of the elongate members at least at some corners of the frame, each of the corner connectors comprising:

first and second elements affixed to respective elongate members proximate to the adjacent ends forming the corner, each such element including a portion extending from the respective elongate member to terminate at a remote end laterally spaced apart from the adjacent end of the respective elongate member; and adjusting means interconnecting the remote ends of the first and second elements and selectively operable to adjust the included angle between the first and second elements of the corner connector, so as to maintain the predetermined included angle at the corner;

with the laterally spaced-apart location of the adjusting means at the remote ends of the first and second elements locating the adjusting means out of longitudinal alignment with the elongate members at the corner and inside the frame formed by the elongate members, whereby the angle adjusting means does not interfere with the adjacent ends at the corner.

13. The frame as in claim 12, wherein:

said portions of the corner connector elements extend both laterally and longitudinally from the respective elongate members to which the corner connectors are affixed, so as to locate the adjusting means beyond the ends of the respective elongate members.

14. The frame as in claim 12, wherein:

said portions of the corner connector elements extend substantially diagonally from the respective elongate members to which the corner connectors are affixed, so as to locate the adjusting means inside the frame and beyond the ends of the respective elongate members.

* * * * *